(12) United States Patent
Choi

(10) Patent No.: US 9,381,937 B2
(45) Date of Patent: Jul. 5, 2016

(54) ELECTRO-HYDRAULIC POWER STEERING APPARATUS FOR ENVIRONMENT-FRIENDLY VEHICLE AND METHOD OF CONTROLLING THE SAME

(71) Applicant: Hyundai Motor Company, Seoul (KR)

(72) Inventor: Young Seol Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/145,122

(22) Filed: Dec. 31, 2013

(65) Prior Publication Data

US 2015/0041239 A1    Feb. 12, 2015

(30) Foreign Application Priority Data

Aug. 9, 2013    (KR) .......................... 10-2013-0094609

(51) Int. Cl.
  *B62D 5/06*    (2006.01)
  *B62D 5/08*    (2006.01)
  *B62D 5/065*    (2006.01)

(52) U.S. Cl.
  CPC . *B62D 5/065* (2013.01); *B62D 5/06* (2013.01)

(58) Field of Classification Search
  CPC ............ B62D 5/065; B62D 6/02; B62D 6/00; B62D 7/159; B62D 5/0463; B62D 6/003
  USPC ................. 180/422, 132, 141, 142, 143, 149; 701/42; 91/375, 449; 137/625.21, 137/625.22, 625.23
  See application file for complete search history.

(56) References Cited

U.S. PATENT DOCUMENTS

| | | | | |
|---|---|---|---|---|
| 4,665,698 | A | * | 5/1987 | Trusock .......................... 60/422 |
| 4,947,328 | A | * | 8/1990 | Sugasawa .............. B62D 7/159 180/415 |
| 5,267,627 | A | * | 12/1993 | Frank et al. .................... 180/422 |
| 7,213,676 | B2 | | 5/2007 | Soeda et al. |

FOREIGN PATENT DOCUMENTS

| | | |
|---|---|---|
| JP | 08-216904 | 8/1996 |
| KR | 20-1998-051694 U | 10/1998 |
| KR | 10-1999-0054270 A | 7/1999 |
| KR | 10-0259525 B1 | 3/2000 |
| KR | 10-0259525 B1 | 6/2000 |
| KR | 10-2004-0106707 | 12/2004 |
| KR | 10-0542607 | 1/2006 |
| KR | 10-2007-0035788 A | 4/2007 |

* cited by examiner

*Primary Examiner* — Jacob Knutson
(74) *Attorney, Agent, or Firm* — Mintz Levin Cohn Ferris Glovsky and Popeo, P.C.; Peter F. Corless

(57) ABSTRACT

An electro-hydraulic power steering apparatus for an environment-friendly vehicle and a method of controlling the same is provided. In particular, a gear box assists in a steering force of a steering wheel, and a reservoir tank stores hydraulic oil therein. An electro-hydraulic power pump pumps the hydraulic oil via an electric motor to supply the hydraulic oil to the gear box. A first valve is mounted to a hydraulic line through which the hydraulic oil flows from the electro-hydraulic power pump to the gear box, and a second valve is mounted to a hydraulic line through which the hydraulic oil returns from the gear box to the reservoir tank.

2 Claims, 5 Drawing Sheets

ELECTRO-HYDRAULIC POWER STEERING APPARATUS FOR ENVIRONMENT-FRIENDLY VEHICLE AND METHOD OF CONTROLLING THE SAME

CROSS-REFERENCE TO RELATED APPLICATION

This application claims under 35 U.S.C. §119(a) the benefit of Korean Patent Application No. 10-2013-0094609, filed on Aug. 9, 2013, the entire contents of which are incorporated herein by reference.

BACKGROUND (a) Technical Field

The present invention relates to an electro-hydraulic power steering apparatus for an environment-friendly vehicle and a method of controlling the same. More particularly, it relates to an electro-hydraulic power steering apparatus for an environment-friendly vehicle which can prevent a hydraulic pressure for maintaining a steering angle of a steering wheel from being released when the steering angle of the steering wheel is maintained at not less than a particular angle, and a method of controlling the same.

(b) Background Art

In general, environment-friendly vehicles have been studied and developed as an alternative for decreasing fuel costs and reducing exhaust gas through improvement of fuel efficiency. In particular, in a case of commercial vehicles (e.g., buses, trucks, and the like) which utilized a large amount of oil, it is known that fuel efficiency thereof is remarkably improved.

Electro-hydraulic power steering (EHPS) apparatuses instead of engine mount hydraulic power pumps are typically mounted within the environment-friendly commercial vehicles (diesel hybrid buses or the like) or commercial vehicles, in order to improve fuel efficiency thereof.

For reference, an electro-hydraulic power steering (EHPS) apparatus refers to a steering apparatus for assisting in steering by actuating a hydraulic pump through an operation of an independent electric motor.

As shown in FIG. 1, an electro-hydraulic power steering apparatus mounted to an environment-friendly vehicle according to the related art includes a gear box 10 for assisting a steering force of a steering wheel, a reservoir tank 20 for storing hydraulic oil, and an electro-hydraulic power pump 30 for pumping the hydraulic oil by an electric motor to supply the hydraulic oil in the reservoir tank 20 to the gear box 10.

Referring to FIG. 2, the gear box 10 includes a worm shaft 11 connected to the steering wheel, a piston 12 elevated in internal contact with the worm shaft 11 when the worm shaft 11 is rotated in place, a sector gear 13 for transferring a force to a pitman arm and a drag link while being engaged with a worm formed on a surface of the piston 12 to be rotated, to perform steering of a vehicle, and an upper hydraulic chamber 14 and a lower hydraulic chamber 15 formed at an upper side and a lower side of the piston 12, respectively.

Further, a hydraulic oil supply line 16 that supplies the hydraulic oil to the upper hydraulic chamber 14 or the lower hydraulic chamber 15 is connected to an input end of the gear box 10, and a hydraulic oil return line 17 is connected to an output end of the gear box 10. Also, the electro-hydraulic power pump 30 is connected to an end of the hydraulic oil supply line 16, and the reservoir tank 20 is connected to an end of the hydraulic oil return line 17.

Here, an operation flow of the electro-hydraulic power steering apparatus according to the related art will be briefly described below.

First, when a signal of a steering angle detection sensor (not shown), which has detected a change in a steering angle of the steering wheel, is input to a controller, and an operation signal is transferred from the controller to the electro-hydraulic power pump 30 at the same time, and an electric motor (not shown) installed in the electro-hydraulic power pump 30 is operated.

Next, the hydraulic oil in the reservoir tank 20 flows along the hydraulic oil supply line 16 through the pumping operation of the electro-hydraulic power pump 30, and is introduced into the upper hydraulic chamber 14 or the lower hydraulic chamber 15 of the gear box 10.

When the worm shaft 11 is rotated in place and the piston 12 is raised by a steering operation of the steering wheel toward one side, the hydraulic oil introduced into the lower hydraulic chamber 15 of the gear box 10 provides pressure which upwardly pushes the piston 12 to assist a steering force of the steering wheel. At this time, the hydraulic oil in the upper hydraulic chamber 14 is discharged through a discharge port (not shown) in the upper hydraulic chamber 14, and returns to the reservoir tank 20 along the hydraulic oil return line 17 at the same time.

In contrast, when the worm shaft 11 is rotated in place and the piston 12 is lowered by a steering operation of the steering wheel toward an opposite side, the hydraulic oil introduced into the upper hydraulic chamber 14 of the gear box 10 provides a pressure which downwardly pushes the piston 12 to assist a steering force of the steering wheel. Similarly, the hydraulic oil in the lower hydraulic chamber 15 is discharged through a discharge port (not shown) in the lower hydraulic chamber 15, and returns to the reservoir tank 20 along the hydraulic oil return line 17 at the same time.

A steering angle of the steering wheel increases in a situation such as cornering, parking, and U-turn. As the steering angle increases, a desired hydraulic pressure supplied into the gear box cannot help increasing exponentially as shown in a hydraulic pressure graph of FIG. 3. In order to generate the desired hydraulic pressure, a large amount of currents flow to the electro-hydraulic power pump to generate a torque corresponding to the desired hydraulic pressure. However, since the electro-hydraulic power pump uses a power source having a voltage value of 24 V which is a battery voltage of a commercial vehicle, the following problems may occur.

First, the hydraulic pressure in the gear box should be consistently generated to maintain a steering angle of the steering wheel as the steering angle increases. However, since a large amount of current flows toward the electro-hydraulic power pump, heat is generated in wiring and a power module of the controller as well as a motor of the power pump.

Since the motor in the electro-hydraulic power pump is designed to maintain the maximum torque mode for about 10 seconds, if heat corresponding to not less than a particular level is generated as described above, the power restriction mode for the motor and the controller protection logic are executed to protect the controller and the like. As a result, the power restriction mode and the protection logic restrain the steering performance, thereby causing the steering instability.

In addition, the hydraulic pressure supplied into the gear box of the power steering apparatus is released due to the power derated by the protection logic so that the steering wheel may be rapidly released to a neutral position, thereby causing injuries to a driver.

Finally, since the electro-hydraulic power pump uses a 24 V battery power source, the battery power source is unreliable if it is over utilized.

SUMMARY OF THE DISCLOSURE

The present invention has been made in an effort to solve the above-described problems associated with prior art. In particular, the present invention provides an electro-hydraulic power steering apparatus of an environment-friendly vehicle, in which valves are mounted to a hydraulic oil supply line and a discharge line of a gear box and when a steering angle of a steering wheel is maintained at not less than a particular angle during, for example, cornering, parking, or U-turn, a hydraulic pressure supplied to the gear box to maintain a steering angle can be prevented from being released by controlling the valves to be closed and unnecessary battery power consumption can be reduced by stopping an operation of the electro-hydraulic power pump when the valves are closed.

In accordance with an aspect of the present invention, there is provided an electro-hydraulic power steering apparatus for an environment-friendly vehicle, the apparatus including: a gear box for assisting a steering force of a steering wheel; a reservoir tank for storing hydraulic oil; and an electro-hydraulic power pump for pumping the hydraulic oil by an electric motor to supply the hydraulic oil to the gear box; a first valve mounted in a hydraulic line through which the hydraulic oil flows from the electro-hydraulic power pump to the gear box; and a second valve mounted to a hydraulic line through which the hydraulic oil returns from the gear box to the reservoir tank.

For example, a check valve may be employed as the first valve, and a solenoid valve may be employed as the second valve.

In accordance with another aspect of the present invention, there is provided a method of controlling an electro-hydraulic power steering apparatus for an environment-friendly vehicle, the method including: determining, by controller, whether a steering angle of a steering wheel is not less than a particular angle; determining, by a controller, whether the steering angle steered at not less than a particular angle is varied for a particular time period; controlling, by the controller, a first valve mounted within a hydraulic oil line through which hydraulic oil flows from an electro-hydraulic power pump to a gear box and a second valve mounted to a hydraulic line through which hydraulic oil returns from the gear box to a reservoir tank to be closed, when the steering angle does not change for a particular time period or more; and turning off the electro-hydraulic power pump together with controlling the first valve and the second valve to be closed.

Additionally, in some exemplary embodiments of the present invention, the method further includes controlling the first valve and the second to be opened when the first valve and the second valve are controlled to be closed and then the steering angle of the steering wheel varies.

The method further includes turning on the electro-hydraulic power pump after the first valve and the second valve are controlled to be opened.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
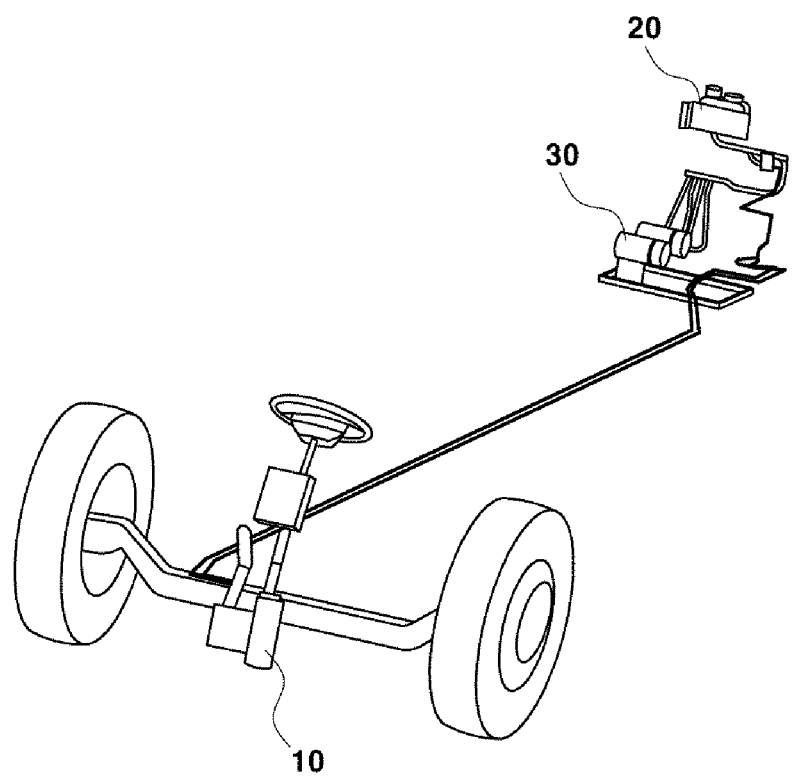
FIG. 1 is a schematic view showing an electro-hydraulic power steering apparatus mounted to an environment-friendly commercial vehicle.
Figure 2:
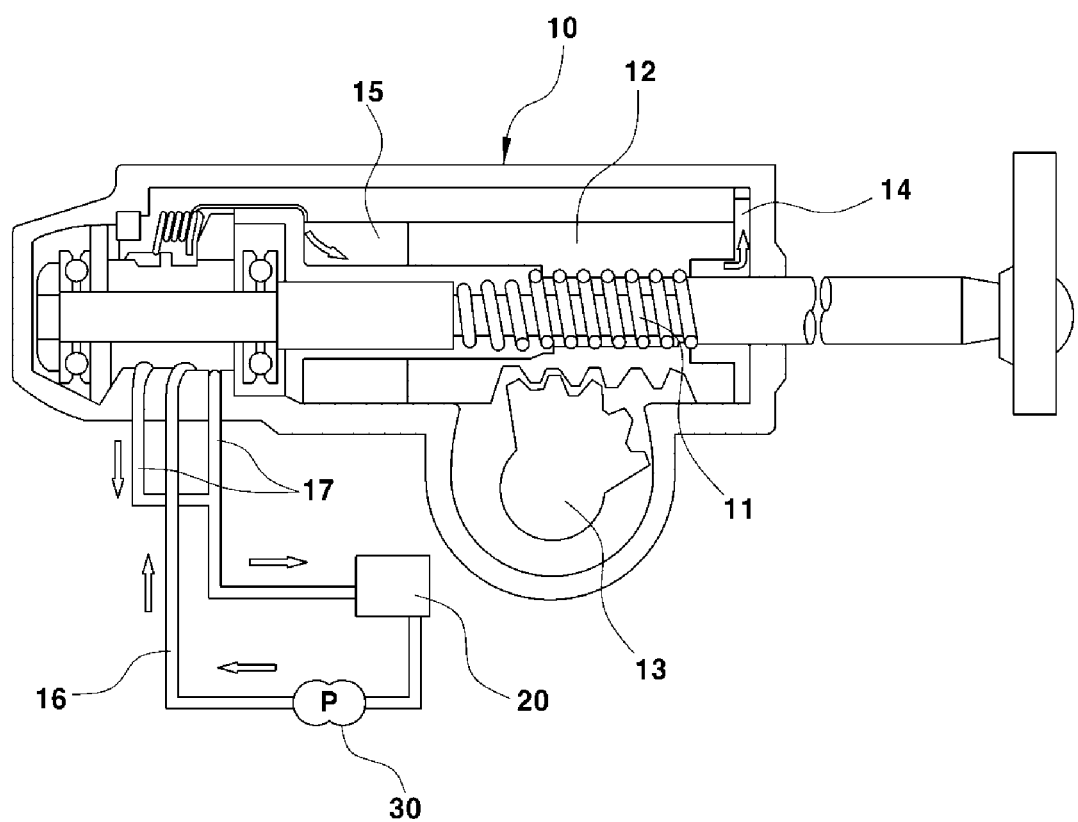
FIG. 2 is a schematic view showing a state where an electro-hydraulic power pump and a reservoir tank are connected to a gear box of the electro-hydraulic power steering apparatus according to the related art through hydraulic oil lines.
Figure 3:
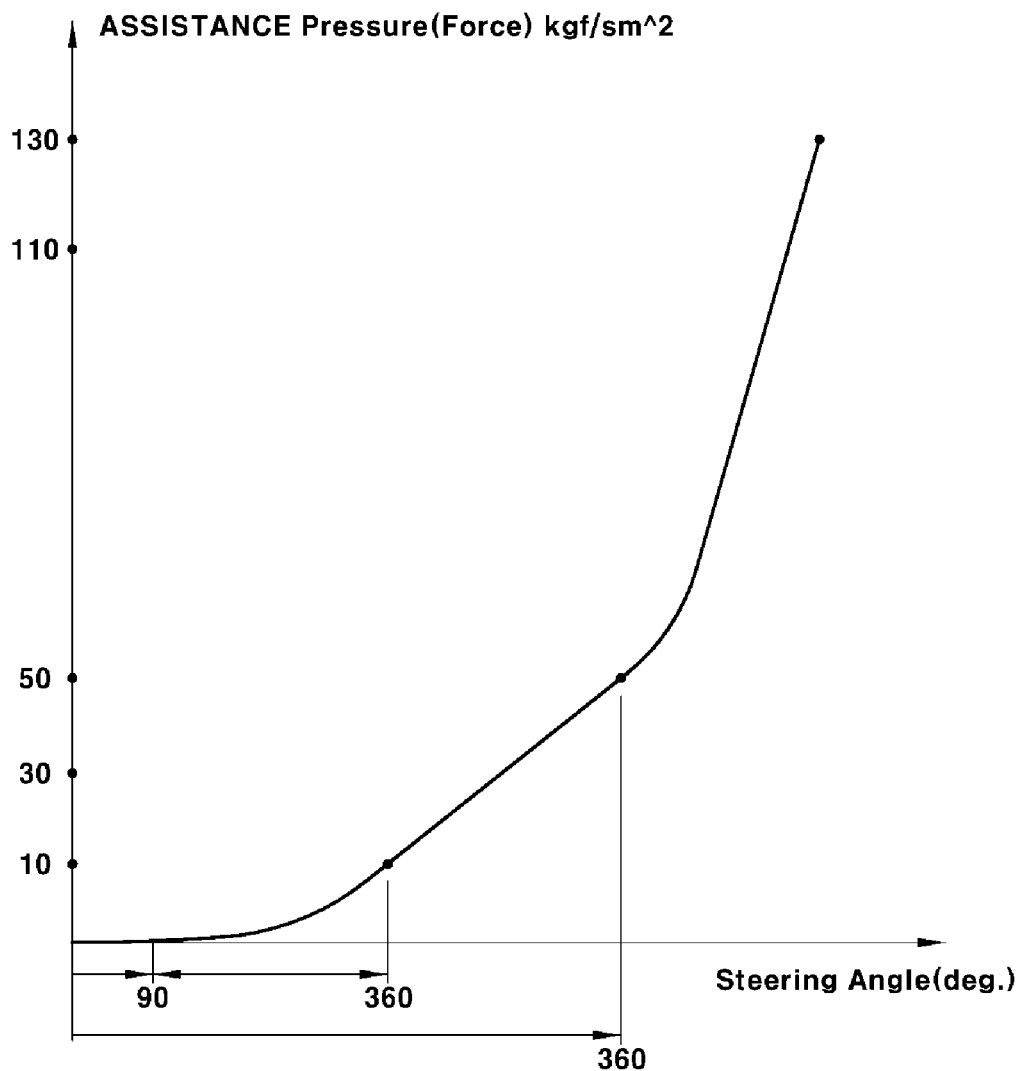
FIG. 3 is a hydraulic pressure graph depicting a change in hydraulic pressure supplied from the electro-hydraulic power pump to the gear box according to a steering angle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an embodiment of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g., fuels derived from resources other than petroleum).

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 4:
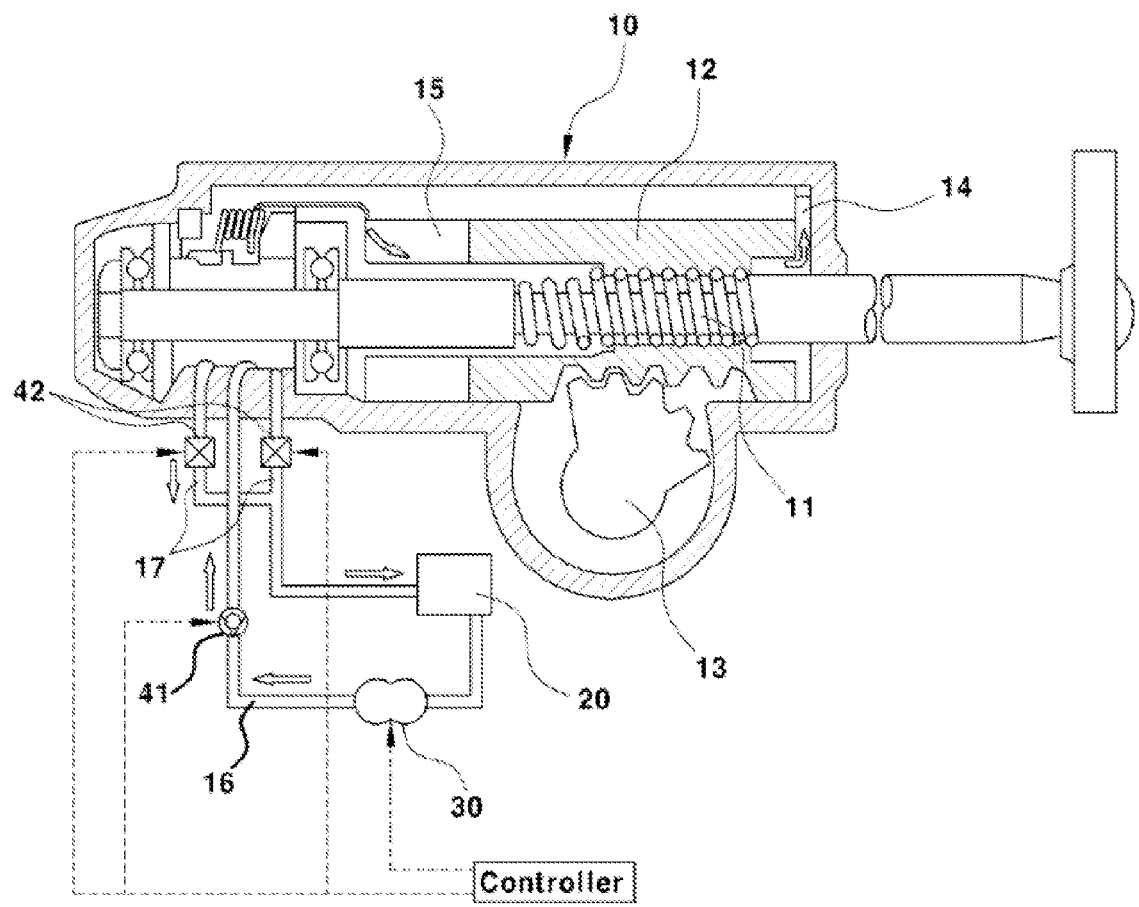
FIG. 4 is a schematic view showing an electro-hydraulic power steering apparatus according to the present invention.

Referring to FIG. 4, an electro-hydraulic power steering apparatus of an environment-friendly vehicle according to the present invention is configured such that a gear box 10 that assists a steering force of a steering wheel, a reservoir tank 20 that stores hydraulic oil, and an electro-hydraulic power pump 30 that supplies the hydraulic oil in the reservoir tank 20 to the gear box 10 are fluidly connected to each other by a hydraulic oil supply line 16 and a hydraulic oil return line 17 to constitute a closed-loop.

As described above, the gear box 10 includes a worm shaft 11 connected to a steering wheel, a piston 12 elevated in internal contact with the worm shaft 11 when the worm shaft 11 is rotated in place, a sector gear 13 that transfers a force to a pitman arm and a drag link while being engaged with a worm formed on a surface of the piston 12 to be rotated, to perform a steering of a vehicle, and an upper hydraulic chamber 14 and a lower hydraulic chamber 15 formed on an upper side and a lower side of the piston 12, respectively.

Further, one end of the hydraulic oil supply line 16 for supplying hydraulic oil to the upper hydraulic chamber 14 and the lower hydraulic chamber 15 is connected to an input end of the gear box 10, and one end of a hydraulic oil return line 17 is connected to an output end of the gear box 10.

Further, an opposite end of the hydraulic oil supply line 16 is connected to an output side of the electro-hydraulic power pump 30, and an opposite end of the hydraulic oil return line 17 is connected to the reservoir tank 20. Here, a first valve 41 preventing a reverse flow of the hydraulic oil is mounted within a hydraulic line through which the hydraulic oil flows from the electro-hydraulic power pump 30 to the gear box 10, that is, the hydraulic oil supply line 16 or a hydraulic oil inlet side of the gear box 10, and a second valve 42 opening and closing a discharge flow of the hydraulic oil is mounted to a hydraulic line through which the hydraulic oil returns from the gear box 10 to the reservoir tank 20, that is, the hydraulic oil return line 17 or a hydraulic oil outlet side of the gear box 10.

Preferably, a check valve may be employed as the first valve 41 to prevent the hydraulic oil which has flowed from the electro-hydraulic power pump 30 to the upper hydraulic chamber 14 or the lower hydraulic chamber 15 of the gear box 10, from reversely flowing. However, the first valve is not limited thereto.

Further, a solenoid valve opened and closed by an electrical signal may be employed as the second valve 42, and this is done to temporarily prevent the hydraulic oil which has entered the upper hydraulic chamber 14 or the lower hydraulic chamber 15 of the gear box 10 from returning to the reservoir tank 20 in order to maintain the steering angle when the steering angle of the steering wheel becomes large, as described below.

Figure 5:
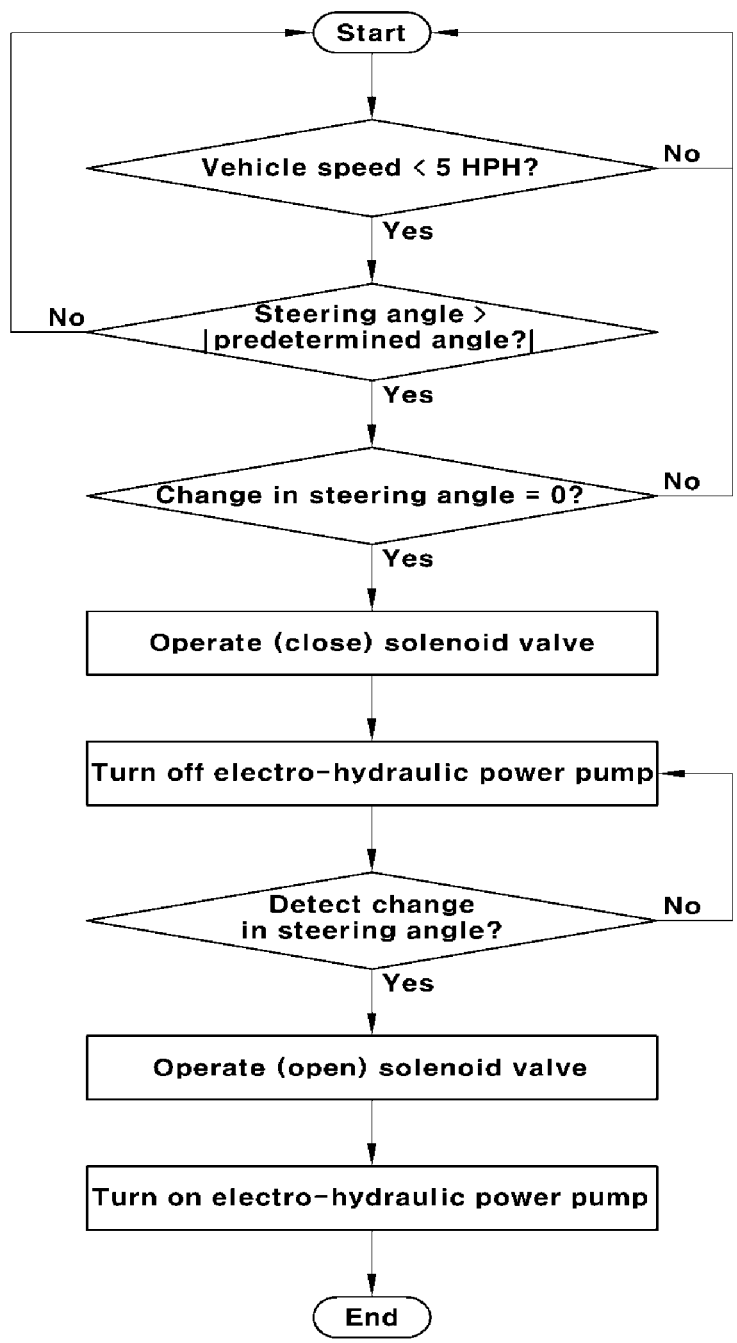
FIG. 5 is a flowchart showing an operation control flow for an electro-hydraulic power steering apparatus according to the present invention.

Here, an operation flow for the electro-hydraulic power steering apparatus according to the present invention, formed by the above-mentioned configuration, will be described with reference to FIGS. 4 and 5.

First, a controller, (not shown) may determine whether a steering angle of a steering wheel is turned beyond a particular angle or more at a particular vehicle speed or higher. That is, a signal which has detected that steering a particular angle or more (for example, a steering angle having not less than 500 degrees in a situation such as cornering, parking, and U-turn) is performed in a steering angle detection sensor is transferred to a controller.

Next, the controller determines whether the steering angle has been turned to at least a particular angle has changed within a given period of time. That is, after the steering angle detection sensor detects whether a vehicle is steered at not less than a particular angle (for example, a steering angle having not less than 500 degrees in a situation such as cornering, parking, and U-turn), the controller checks a time when a next steering signal (for example, steering of the opposite direction) is input.

Next, when a steering angle does not change for a particular time period, that is, when the controller determines that a time period for which a next steering signal is not input after a particular time period, the controller controls the first valve 41 and the second valve 42 to be closed.

In an embodiment when a check valve is employed as the first valve 41, a control to electrically close a hydraulic line is not performed. However, when a solenoid valve is employed as the first valve 41, a control to electrically close a hydraulic line is performed by the controller. Thus, since the hydraulic oil supplied to the upper hydraulic chamber 14 or the lower hydraulic chamber 15 of the gear box 10 is blocked by the first valve 41 and the second valve 42 in order to maintain the steering angle, hydraulic pressure can be prevented from being released due to temporarily discharging of the hydraulic oil. Accordingly, when the steering wheel turned beyond a particular angle can be maintained, and as such, a phenomenon where the steering wheel is suddenly released to a neutral position, which has occurred conventionally, can be prevented.

As such, the electro-hydraulic power pump 30 is turned off at the same time when the first valve 41 and the second valve 42 are controlled to be closed. That is, since there is no need to supply the hydraulic oil to the gear box when the hydraulic oil supplied to the upper hydraulic chamber 14 or the lower hydraulic chamber 15 of the gear box 10 is blocked by an operation to close the hydraulic line by the first valve 41 and the second valve 42, the electro-hydraulic power pump 30 can be and is turned off.

In the illustrative embodiment of the present invention, the first valve 41 and the second valve 42 are closed in such a manner, the electro-hydraulic power pump 30 is turned off, thereby reducing battery power consumption, preventing heat generation according to an existing sustained operation of the power pump, and preventing damage to the power pump controller according to the heat generation.

Additionally, after the first valve 41 and the second valve 42 are controlled to be closed, the controller controls the first valve 41 and the second valve 42 to be opened when the steering angle of the steering wheel changes. Further, after the first valve 41 and the second valve 42 is controlled to be opened, the controller controls the electro-hydraulic power pump 30 to be turned on to be operated as normal, and an operation of the electro-hydraulic power pump 30 to pump the hydraulic oil and the steering operation of the steering wheel according to the same are performed normally.

Accordingly, the present invention provides following effects through the technical solutions.

In accordance with the present invention, a first valve is mounted to a hydraulic line through which hydraulic oil flows from an electro-hydraulic power pump to a gear box, and a second valve is mounted to a hydraulic line through which the hydraulic oil returns from the gear box to a reservoir tank, and when a steering angle of a steering wheel is maintained at or beyond a particular angle in a situation such as cornering, parking, and U-turn, the valves are controlled to be closed so that hydraulic pressure which has been already supplied to the gear box can be prevented from being released, making it possible to maintain the steering angle of the particular angle.

In particular, an operation of the electro-hydraulic power pump is stopped when the valves are closed so that unnecessary battery power consumption can be reduced, heat generation according to a sustained operation of the existing power pump can be prevented, and damage to a power pump controller according to the heat generation can be prevented.

What is claimed is:

1. A method of controlling an electro-hydraulic power steering apparatus for an environment-friendly vehicle, the method comprising the steps of:
    determining, by a controller, whether a steering angle of a steering wheel has been turned at or beyond a particular angle;
    in response to determining that the steering angle is at or beyond the particular angle, determining, by the controller, whether the steering angle has changed within a particular time period;
    controlling, by the controller, a first valve mounted within a hydraulic oil line through which hydraulic oil flows from an electro-hydraulic power pump to a gear box and a second valve mounted to a hydraulic line through which the hydraulic oil returns from the gear box to a reservoir tank to be closed, when the steering angle has not changed within the particular time period;
    turning off, by the controller, the electro-hydraulic power pump together with controlling the first valve and the second valve to be closed; and
    controlling the first valve and the second valve to be opened when the steering angle has changed.

2. The method of claim 1, further comprising the step of:
    turning on, by the controller, the electro-hydraulic power pump after the first valve and the second valve are controlled to be opened.

* * * * *